March 18, 1969 F. T. IRGENS 3,433,498
LAWN MOWER
Filed Nov. 10, 1965 Sheet 1 of 2

INVENTOR
FINN T. IRGENS
BY
Wheeler, Wheeler & Wheeler
ATTORNEYS

INVENTOR
FINN T. IRGENS
BY Wheeler, Wheeler & Wheeler
ATTORNEYS

United States Patent Office 3,433,498
Patented Mar. 18, 1969

3,433,498
LAWN MOWER
Finn T. Irgens, Milwaukee, Wis., assignor to Outboard Marine Corporation, Waukegan, Ill., a corporation of Delaware
Filed Nov. 10, 1965, Ser. No. 507,162
U.S. Cl. 280—47.11                           12 Claims
Int. Cl. A01d 35/26; B62b 11/00

ABSTRACT OF THE DISCLOSURE

Disclosed herein is a lawn mower having a blade housing universally connected to and supported by a linkage pivotally connected to the main frame.

---

This invention relates to lawn mowers and, more particularly, to blade housing mounting arrangements for lawn mowers.

An object of the invention is to provide a lawn mower having a blade housing mounting arrangement which reduces blade housing tilting caused by vertical movement of one or more of the lawn mower wheels.

Another object of the invention is to provide a lawn mower having side skirts which prevent sideward expulsion of foreign objects and which are incorporated in the housing mounting arrangement so that the skirts can move vertically upwardly to clear objects on the ground without raising the lawn mower wheels and with minimum tilting of the blade housing.

In accordance with the invention, the lawn mower is provided with a frame including a main frame portion and a front wheel sub-frame which is pivotable about a fore and aft axis. The main frame portion carries a linkage which includes left and right front and rear side members which are pivotally connected to each other and which are respectively pivotally connected to the front wheel sub-frame and to the main frame portion. The linkage is H-shaped and further includes a transverse beam pivotally connected at opposite ends thereof to and between the left and right front side members. A blade housing is connected to the H-shaped linkage at three points and is disposed below the transverse beam and between the left and right front and rear side members. The housing is pivotally connected, at opposite sides thereof, to the left and right rear side members, and is universally connected to the transverse beam intermediate the ends thereof.

The left and right front side members include inturned flanges which engage an adjacent top portion of the left and right rear side members to afford locking of the corresponding pivotally connected side members against pivotal downward movement beyond a predetermined point. The left and right rear side members are provided with skirt portions which have arcuate lower edges. The skirt portions generally extend below the plane of the blade housing to prevent sideward discharge of foreign objects.

With the above mounting arrangement of the blade housing to the frame, the tilt of the blade housing is reduced upon elevation of one of the wheels. Also upon upward pivotal movement of either of the left or right front and rear side members, the housing remains generally parallel in a fore and aft direction, and all of the wheels generally remain in contact with the ground.

Other objects, advantages and features will become apparent from the following description and accompanying drawings in which.

Figure 1:
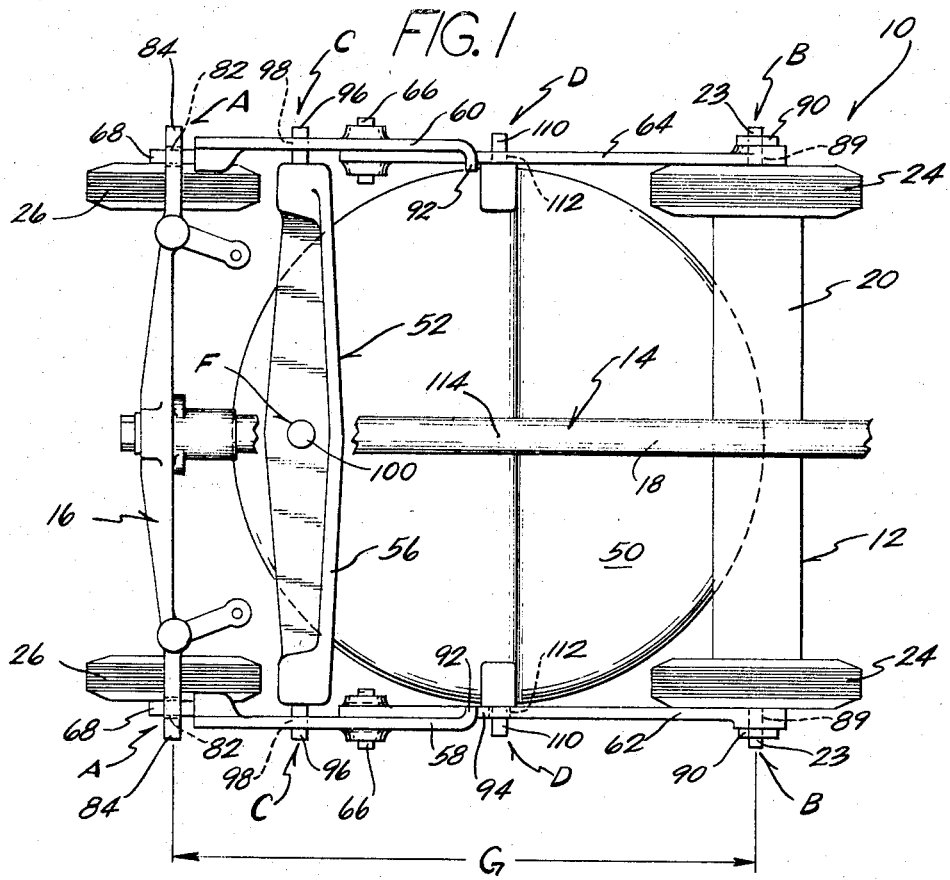
FIGURE 1 is a plan view of a lawn mower incorporating various of the features of the invention.

Referring now to the drawings and more particularly to FIGURE 1, the lawn mower 10 generally includes a frame 12 comprising a main frame portion 14 and a front wheel sub-frame 16. The main frame portion 14 includes a fore and aft member 18 connected to a transverse member 20 by a suitable bracket 22. A pair of rear wheel axles 23 are connected to opposite ends of the transverse member 20 and rotatably carry a pair of rear wheels 24.

Means are provided for mounting a pair of front wheels 26 on the frame 12 for rotation about respective transverse or horizontal axes, for dirigible movement about respective vertical axes, and for common transverse rocking movement about a fore and aft horizontal axis. In the preferred embodiment (see FIGURE 3), such means comprises the front wheel sub-frame 16 carrying a pair of front wheel axles 28 mounted on opposite ends of the front wheel sub-frame 16. Each front wheel axle 28 includes a horizontal portion 30 to which the front wheels 26 are respectively connected for rotatable movement of the front wheels about horizontal axes and a vertical portion 32 carried in vertically aligned bores 34 of the front wheel frame 16 to provide dirigible movement of the respective front wheels 26 about vertical axes. Also, the front wheel sub-frame 16 is centrally pivotally mounted by suitable pivot means 36 to the fore and aft member 18 of the main frame portion 14 through a downwardly depending bracket 38 (see FIGURES 2 and 3) fixed to the end of the fore and aft member 18 to provide transverse rocking movement of the front wheel sub-frame 16 about a fore and aft axis coincident with the axis of the fore and aft member 18.

The lawn mower 10 can be steered by movement of steering knuckles 42 which are received in corresponding slots 40 in the front wheel sub-frame 16.

This invention is applicable to any type of blade housing, and in the illustrated embodiment, a rotary blade housing 50 is shown and is carried beneath the fore and aft member 18. Specifically, the rotary blade housing 50 is pivotally connected to a linkage 52 which is generally H-shaped and which is pivotally connected to the front wheel sub-frame 16 and to the main frame portion 14 rearwardly of the front wheels 26. In the illustrated embodiment, linkage 52 includes left and right hand front side members 58 and 60, left and right hand rear side members 62 and 64, and a transverse support beam 56.

The respective left hand and right hand, front and rear side members 58, 62 and 60, 64 are pivotally connected to each other by suitable pivot means 66. The left and right hand front side members 58 and 60 are connected (points A) to the front wheel sub-frame 16 proximate the opposite ends thereof to afford movement of the members 58 and 60 pivotally about a transverse axis and linearly along a fore and aft axis. Specifically, the front side members 58 and 60 are respectively provided with stub shafts 68 which are respectively received in suitable, generally laterally aligned bores 82 in the sidewardly extending flanges 84 of the front wheel sub-frame 16. The bores 82 are sufficiently oversized to afford pivotal movement of the stub shafts 68 about a horizontal transverse axis and linear movement of the stub shafts 68 axially of the bores 82.

The right and left hand rear side members 62 and 64 are pivotally connected (points B) to the main frame portion 14 for vertical pivotal movement. In the preferred embodiment, the rear side members 62 and 64 are provided with bores 89 in which are respectively received the portions of the rear axles 23 which extend beyond the rear wheels 24, and the members 62 and 64 are retained by any suitable locking devices 90.

Figure 4:
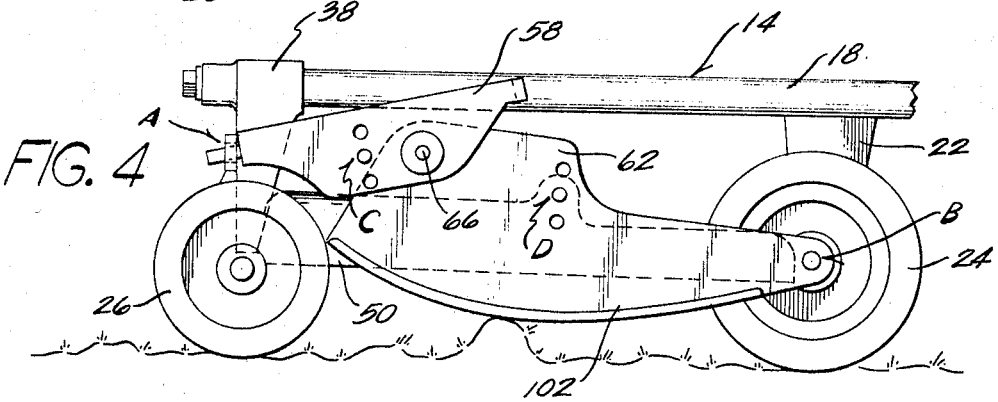
FIGURE 4 is a side elevational view similar to FIGURE 2 and showing several components of the lawn mower in a changed position.

Adjacent portions of left and right hand front and rear side members are prevented from swinging downwardly beyond a predetermined point by engagement of an inturned flange 92 on the front side members 58 and 60 with the top edges 94 of the rear side members 62 and 64. When the inturned flanges 92 are engaged with the top edges 94, the corresponding front and rear side members 58, 62 and 60, 64 act as beams to prevent their further pivotal movement downwardly. However, the beam effect is broken upon application of an upward force to any of the side members 58, 60, 62 and 64. For example, if the left hand rear side member 62 were forced upwardly by engaging a foreign object on the ground (as shown in FIGURE 4), the adjacent front and rear side members 58 and 62 can swing about pivot 66 and rock upwardly.

The transverse beam 56 is respectively pivotally connected (point C) to the front side members 58 and 60 by means of stub shafts or pintles 96 which are disposed at the opposite ends of beam 56 and which are received in suitable bores 98 in the front left and right hand side members 58 and 60 to complete the H-shaped linkage 52.

The blade housing 50 is supported at three points (laterally aligned points D and point F) from the H-shaped linkage 52. The housing 50 includes a pair of oppositely disposed and laterally aligned pivots 110 which are connected to the top of housing 50 and which are received in correspondingly aligned bores 112 in rear side members 62 and 64 to provide pivotal connections (at points D) of the blade housing 50 to the respective rear side members 62 and 64. The mower blade housing 50 is universally connected (point F) to the transverse beam 56 intermediate the ends thereof, by a suitable universal connection 100 to complete the three point connection of the blade housing 50 to the H-shaped linkage 52. The universal connection 100 is generally aligned with the stub shafts 96 of the transverse beam 56.

Figure 2:
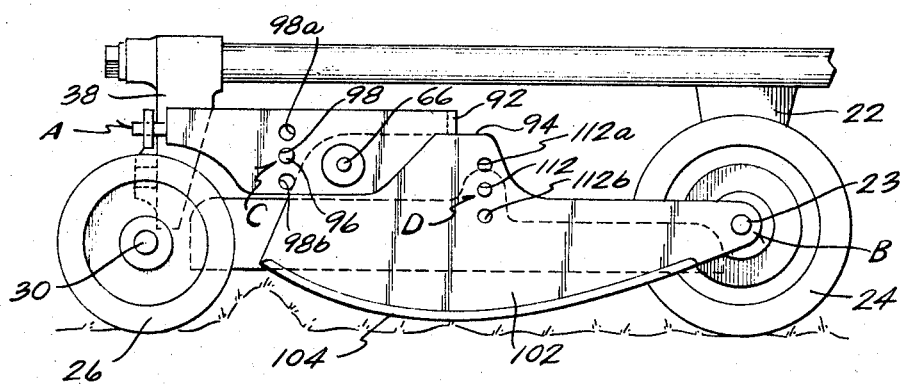
FIGURE 2 is a side elevational view of the lawn mower shown in FIGURE 1.
Figure 3:
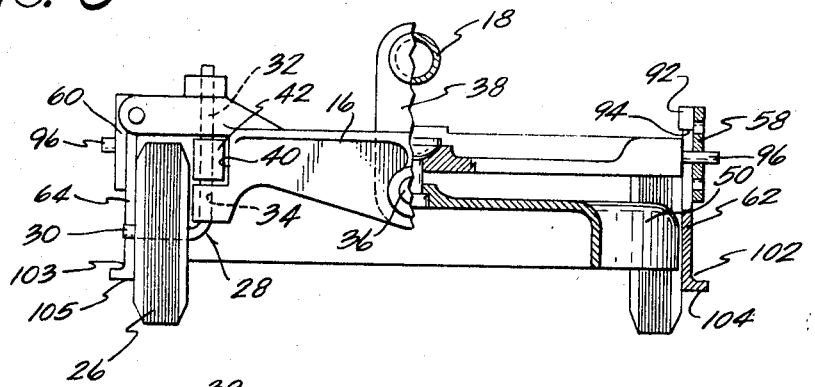
FIGURE 3 is a front elevational view, with parts removed and in section, of the lawn mower shown in FIGURE 1.

To prevent sideward expulsion of foreign particles, the mower 10 is provided with side skirts 102 and 103 (FIGURES 2 and 3). The skirts 102 and 103 are respectively defined by the lower portions of the rear side members 62 and 64. The skirts 102 and 103 extend substantially between the front and rear wheels 24 and 26, extend below the blade housing 50, and respectively include arcuate lower edges 104 and 105 to facilitate movement of the rear side members 62 and 64 over ground obstacles, as shown in FIGURE 4.

In the preferred embodiment, the pivotal connections 66 of the left and right hand, front and rear side members to each other are respectively located at a distance from the pivotal connections B of the rear side members 62 and 64 to the main frame portion 14 equal to ⅔ of the distance (hereinafter identified as the distance G) between the pivotal connections A of the front side members 58 and 60 to the front wheel sub-frame 16 (measured from the transverse centerlines of shafts 82) and the pivotal connections B of the rear side members 62 and 64 to the main frame portion 14. The pivotal connections D of the blade housing 50 to the rear side members 62 and 64 are respectively located from the pivotal connections B of the rearward side members 62 and 64 to the main frame portion 14 at a distance equal to 4/9 of the distance G. The pivotal connections C of the transverse beam 56 to the front side members 58 and 60 are respectively located from the pivotal connections B of the rear side members 62 and 64 to the main frame 14 at a distance equal to ⅞ of the distance G.

Referring now to FIGURE 4, when the arcuate edge 104 of the skirt 102 rides over a rock or other object on the ground, the front and rear side members 58 and 60 will move upwardly, as shown in FIGURE 4, and pivot about pivotal connection 66 which also moves upwardly a distance approximately equal to the height of the bump. If the pivotal connection 66 moves up a distance of one unit, the pivotal connection C of the transverse beam 56 to the front side member 58 moves upwardly ⅔ of a unit, and the pivotal connection D of the blade housing 50 to the rearward side member 62 also moves up ⅔ of a unit. Therefore, the housing 50 remains generally parallel to the ground in a fore and aft direction, and in a lateral or sideward direction, the side of the housing 50 adjacent the side members 58 and 60 moves upwardly a distance of ⅔ of the height of bump. The universal connection 100, moves up ½ of ⅔ or ⅓ of a unit because the connection is equally spaced between the front side members 58 and 60.

Figure 5:
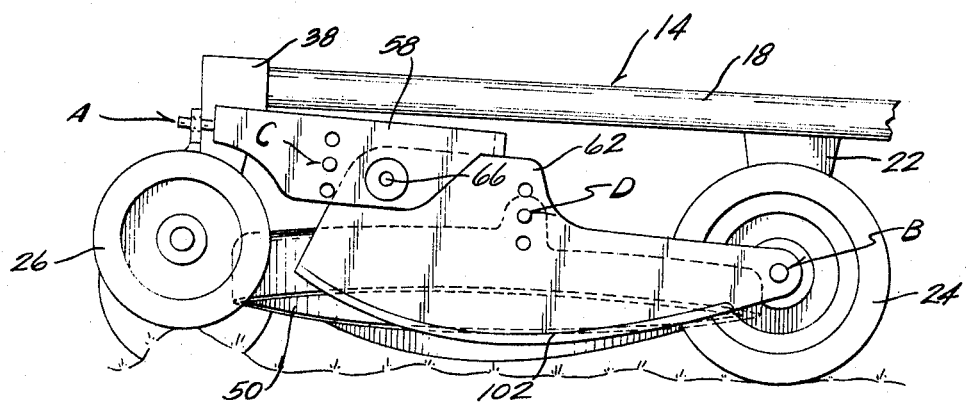
FIGURE 5 is a side elevational view similar to FIGURE 2 and showing several components of the lawn mower in still another changed position.

Referring now to FIGURE 5, when any one of the mower wheels moves upwardly, the other three wheels remain on the ground, and the blade housing tilt is reduced in contrast to a mower having a conventional blade housing mounting arrangement. For example, when the left front wheel moves up one unit (as shown in FIGURE 5), the pivotal connection 66 moves up ⅔ of a unit, the pivotal connection D moves 4/9 of a unit, and the pivotal connection C moves up ⅞ of a unit. Of course, the universal connection 100 which is intermediate the ends of the transverse beam moves up ½ of ⅞ or 7/18 of a unit, and the center 114 of the blade housing 50 moves up approximately ½ of 4/9 or 2/9 of a unit.

Also, as can be noted from the discussion above, the overall upward movement of the blade housing 50 is diminished or reduced as compared to a mower having a standard blade housing mounting arrangement.

The position of the blade housing 50 can be raised or lowered by respectively locating the pintles 96 and pivots 110 in the corresponding holes 98a and 112a or the holes 98b and 112b.

Various of the features of the invention are set forth in the following claims.

What is claimed is:

1. A vehicle including a frame, a linkage pivotally connected to said frame on opposite sides of said frame, a blade housing, and means on said linkage supporting said housing from said linkage for universal movement with respect to said linkage.

2. A vehicle in accordance with claim 1 in further combination with a pair of front wheels, and a pair of rear wheels rotatably carried on said frame and wherein said frame includes a front wheel sub-frame dirigibly and rotatively carrying said front wheels and wherein said linkage is pivotally connected to said front wheel sub-frame and to said frame rearwardly of said front wheel sub-frame.

3. A lawn mower comprising a main frame, left and right hand linkages pivotally connected to said frame, a transverse beam supported pivotally by and between said left and right hand linkages, a blade housing, transversely aligned pivotal connections between each of said linkages and said blade housing, and a universal connection between said transverse beam and said blade housing.

4. A lawn mower in accordance with claim 3 including a main frame portion and a front wheel sub-frame together comprising said frame, a pair of rear wheels rotatably carried on said main frame portion, a pair of front wheels dirigibly and rotatably carried on said front wheel sub-frame, means pivotally connecting said main frame portion and said front wheel sub-frame for pivotal movement therebetween about a fore and aft axis, left and right hand, front and rear side members respectively comprising said left and right hand linkages, said left and right hand front side members being pivotally connected to said front wheel sub-frame at the respective sides thereof, said left and right hand rear side members being pivotally connected to said main frame portion rearwardly of said front wheel sub-frame, pivotal connections respectively joining said left and right hand front members with said left and right hand rear members, a transverse beam supported pivotally by and between said left and right hand front members, and aligned pivotal connections between said rear side members and said blade housing.

5. A lawn mower in accordance with claim 4 wherein said left and right hand rear side members include skirts extending below said blade housing.

6. A lawn mower comprising a frame including a main frame portion and a front wheel sub-frame, a pair of rear wheels rotatably carried on said main frame portion, a pair of front wheels dirigibly and rotatably mounted on said front wheel sub-frame, means pivotally connecting said main frame portion and said front wheel sub-frame for movement therebetween about a fore and aft axis, left and right front side members pivotally connected to said front wheel sub-frame at the respective sides thereof, left and right rear side members pivotally connected to said main frame portion at the respective sides thereof and rearwardly of said front wheel sub-frame, pivotal connections respectively joining said left and right front side members with said left and right rear side members, a transverse beam disposed between said front side members, and pivotal connections joining said beam to said front side members.

7. A lawn mower in accordance with claim 6 wherein said pivotal connection of said left and right front side members to said front wheel sub-frame, said pivotal connection of said left and right rear side members to said main frame portion, and said pivotal connection of said left and right front side members with the left and right rear side members are in the same plane.

8. A lawn mower comprising a frame including a main frame portion and a front wheel sub-frame, a pair of rear wheels carried on said main frame portion for rotation about a horizontal axis, a pair of front wheels dirigibly and rotatably mounted on said front wheel sub-frame, means pivotally connecting said main frame portion and said front wheel sub-frame for pivotal movement therebetween about a fore and aft axis, left and right hand front side members pivotally connected to said front wheel sub-frame at the respective sides thereof, left and right hand rear side members pivotally connected to said main frame portion at the respective sides thereof and rearwardly of said front wheel sub-frame, pivotal connections respectively joining said left and right front members with said left and right rear members, said pivotal connections being disposed at a distance from said pivotal connections of said left and right rear members to said main frame portion equal to two-thirds of the distance between said means pivotally connecting said main frame portion and said front wheel sub-frame and said pivotal connection of said left and right rear side members to said main frame portion, a transverse beam supported pivotally at opposite ends thereof by said left and right front members, a rotary blade housing pivotally connected to said rear side members, and a universal connection between said transverse beam and said blade housing.

9. A lawn mower in accordance with claim 8 wherein said transverse beam is respectively pivotally supported at opposite ends thereof by said left and right front members at a distance equal to seven-ninths of the distance between said respective pivotal connections of said rear side members to said main frame portion and said respective pivotal connections of said main frame portion and said front wheel sub-frame, and said pivotal connections of said rear side members to said blade housing being respectively disposed at a distance from said pivotal connections of said rear side members to said main frame portion equal to four-ninths of the distance between said respective pivotal connections of said rear members to said main frame portion and said respective pivotal connections of said front wheel sub-frame with said main frame portion.

10. A lawn mower in accordance with claim 8 wherein said universal connection between said rotary housing and said front wheel sub-frame is disposed at a distance from said pivotal connections of said rear side members to said main frame portion equal to seven-ninths of the distance between said pivotal connections of said rear side members to said main frame portion and said pivotal connections of said front side members to said front wheel sub-frame.

11. A lawn mower in accordance with claim 8 wherein said left and right rear members include skirt portions which extend below said rotary blade housing and between said front and rear wheels.

12. A lawn mower in accordance with claim 11 wherein each of said skirt portions include an arcuate lower edge.

References Cited
UNITED STATES PATENTS

| | | | |
|---|---|---|---|
| 2,998,082 | 8/1961 | Arnot | 56—25.4 X |
| 3,003,574 | 10/1961 | Strunk | 56—25.4 X |
| 3,063,226 | 11/1962 | Pfauser | 56—25.4 |
| 3,195,297 | 7/1965 | Weiland | 56—25.4 |

ANTONIO F. GUIDA, *Primary Examiner.*

U.S. Cl. X.R.

56—25.4